(12) United States Patent
Burk et al.

(10) Patent No.: US 12,043,143 B2
(45) Date of Patent: Jul. 23, 2024

(54) CUSTOMIZED VEHICLE SETTINGS BASED ON OCCUPANT IDENTIFICATION

(71) Applicant: Micron Technology, Inc., Boise, ID (US)

(72) Inventors: Michael Tex Burk, Orangevale, CA (US); Robert Richard Noel Bielby, Placerville, CA (US)

(73) Assignee: Micron Technology, Inc., Boise, ID (US)

( * ) Notice: Subject to any disclaimer, the term of this patent is extended or adjusted under 35 U.S.C. 154(b) by 330 days.

(21) Appl. No.: 16/929,723

(22) Filed: Jul. 15, 2020

(65) Prior Publication Data

US 2022/0016999 A1 Jan. 20, 2022

(51) Int. Cl.
*B60N 2/02* (2006.01)
*B60N 2/00* (2006.01)
*G06V 40/16* (2022.01)

(52) U.S. Cl.
CPC ........... *B60N 2/0248* (2013.01); *B60N 2/002* (2013.01); *G06V 40/172* (2022.01); *B60N 2/0268* (2023.08)

(58) Field of Classification Search
None
See application file for complete search history.

(56) References Cited

U.S. PATENT DOCUMENTS

| | | |
|---|---|---|
| 6,480,616 B1 | 11/2002 | Hata et al. |
| 8,457,838 B1 * | 6/2013 | Fear ................. B60K 35/00 |
| | | 701/1 |
| 2004/0036601 A1 | 2/2004 | Obradovich |
| 2016/0057574 A1 | 2/2016 | Park |
| 2017/0057438 A1 * | 3/2017 | Dow ................. B60N 2/0248 |
| 2018/0143033 A1 | 5/2018 | Hu |
| 2018/0164798 A1 | 6/2018 | Poeppel et al. |
| 2018/0194365 A1 | 7/2018 | Bae et al. |
| 2019/0106021 A1 * | 4/2019 | Dietrich ............... B60N 2/0224 |
| 2019/0265868 A1 * | 8/2019 | Penilla ................ H04L 63/083 |
| 2019/0279447 A1 | 9/2019 | Ricci |
| 2020/0162914 A1 * | 5/2020 | Chun .................... B60N 2/002 |
| 2021/0046888 A1 * | 2/2021 | Vardharajan .......... B60R 16/037 |
| 2021/0173486 A1 * | 6/2021 | Ueda ....................... G06F 3/016 |
| 2021/0232642 A1 * | 7/2021 | Ricci .................... A61B 5/0077 |
| 2022/0366707 A1 | 11/2022 | Kuehnle et al. |

* cited by examiner

*Primary Examiner* — Lail A Kleinman
(74) *Attorney, Agent, or Firm* — Greenberg Traurig (57) ABSTRACT

Embodiments are directed to system and methods for determining the user identity of a vehicle occupant and identifying a corresponding user profile to provide customer settings for the user. In some embodiments, the seat or position of the user is determined and settings are applied depending on the which seat is occupied by the user. In some embodiments, vehicle settings are updated as additional vehicle occupants enter the vehicle.

18 Claims, 5 Drawing Sheets

CUSTOMIZED VEHICLE SETTINGS BASED ON OCCUPANT IDENTIFICATION

Vehicles are equipped with a control panel or user interface to allow a user to change and configure vehicle settings. A user may need to navigate through one or more menus to identify a desired selection each time he or she is transported in the vehicle. A user may interact with a vehicle by pressing buttons or turning knobs. A display screen in the vehicle may present options and show user selections. A vehicle may transport multiple occupants, each have their own desired vehicle settings.

BRIEF DESCRIPTION OF THE DRAWINGS

Many aspects of the present disclosure can be better understood with reference to the attached drawings. The components in the drawings are not necessarily drawn to scale, with emphasis instead being placed upon clearly illustrating the principles of the disclosure. Moreover, in the drawings, like reference numerals designate corresponding parts throughout several views.

DETAILED DESCRIPTION

Various embodiments of the present disclosure relate to customizing a vehicle's settings based on the identity of the occupant. An occupant's identity may be determined through the use of one or more sensors, facial recognition programs, mobile devices, radio frequency identification (RFID) tags, voice recognition, cloud connected user identities, etc. In addition, the seat or position of the occupant may be determined. For example, through the use of one or more sensors, it may be determined that an occupant is sitting in the driver seat, front passenger seat, rear left seat, rear right seat, etc. The vehicle may then be customized or personalized for each of the individual occupants. The customization may depend on where an occupant sits. In some embodiments, the vehicle's settings may be updated or otherwise controlled in response to new passengers entering the vehicle. Privacy settings may be applied depending on the identities of the vehicle occupants and their respective locations within the vehicle. While the foregoing provides a high-level summary, the details of the various embodiments may be understood with respect to the figures.

Figure 1:
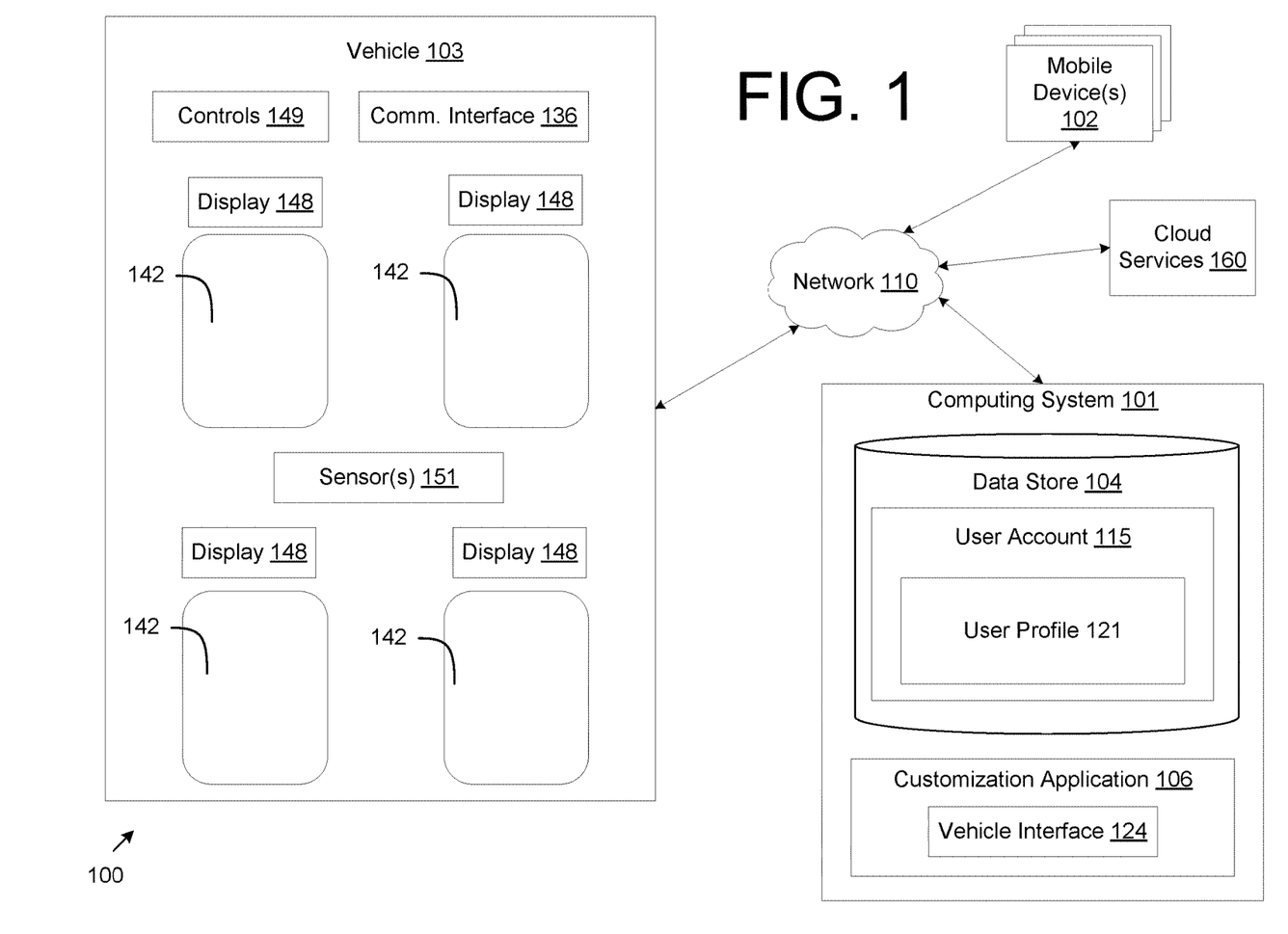
FIG. 1 is a drawing of a networked environment according to various embodiments of the present disclosure.

FIG. 1 shows a networked environment 100 according to various embodiments. The networked environment includes a computing system 101 that is made up of a combination of hardware and software. The networked environment 100 may also include mobile device(s) 102, vehicle(s) 103, and cloud services 160. The computing system 101 includes a data store 104, and a customization application 106. The computing system 101 may be connected to a network 110 such as, for example, the Internet, intranets, extranets, wide area networks (WANs), local area networks (LANs), wired networks, cellular networks, wireless networks, or other suitable networks, etc., or any combination of two or more such networks.

The computing system 101 may comprise, for example, a server computer or any other system providing computing capability. Alternatively, the computing system 101 may employ a plurality of computing devices that may be arranged, for example, in one or more server banks or computer banks or other arrangements. Such computing devices may be located in a single installation or may be distributed among many different geographical locations. For example, the computing system 101 may include a plurality of computing devices that together may comprise a hosted computing resource, a grid computing resource and/ or any other distributed computing arrangement. In some cases, the computing system 101 may correspond to an elastic computing resource where the allotted capacity of processing, network, storage, or other computing-related resources may vary over time. The computing system 101 may implement one or more virtual machines that use the resources of the computing system 101.

Various applications and/or other functionality may be executed in the computing system 101 according to various embodiments. Also, various data is stored in the data store 104 or other memory that is accessible to the computing system 101. The data store 104 may represent one or more data stores 104. This data includes, for example, user accounts 115. A user account 115 may be created and maintained for an individual user. A user account 115 may include a user profile 121. A user profile 121 may include user credentials for authenticating a user. The user profile 121 may also include desired user settings or configurations that are manually provided by a user or automatically generated as the user interacts with component in the networked environment 100. The user account 115 may be accessible from a server or other computing system 101. In some embodiments, the user account 115 may be stored locally at a mobile device 102 or within a memory of a vehicle 103. The user account may be redundant among a fleet of vehicles 103 that store duplicate versions of the user account 115.

As mentioned above, the components executed in the computing system 101 may include a customization application 106, which may access the contents of the data store 104. The customization application 106 may comprise a vehicle interface 124 for communicating with a vehicle 103. The customization application 106 tracks users who enter vehicles 103, tracks their identities and positions within a vehicle 103, maintains a user profile 121 for each user, and manages vehicle settings for users according to their user profiles 121. The customization application 106 may include a portal to give users access to functionality provided by the customization application 106. For example, a user using a mobile device 102 may access the portal provided by the customization application 106.

As noted above, the computing environment 100 may include a mobile device 102. The mobile device 102 may be a laptop, cellular phone, personal computing device, wearable device, or other computing device that is configured to communicate over the network 110. The mobile device 102 may include a browser or dedicated application to communicate with the customization application 106. In some embodiments, the mobile device 102 may be installed or otherwise affixed to the vehicle 103.

The computing environment 100 also includes a vehicle 103. The vehicle includes communication interface 136 that may be installed or otherwise implemented in the vehicle 103. The communication interface 136 may allow data generated within the vehicle 103 to be communicated to a computing system 101 over a network 110. The communication interface 136 may comprise, for example, a wireless receiver, wireless transmitter, a modem, or other device that provides communication over the network 110. In some embodiments, the communication interface 136 may comprise a hot spot or access point for allowing mobile devices 102 to connect to the network 110. This may provide network access to mobile devices 102 of vehicle occupants.

The vehicle 103 includes a plurality of seats 142. A seat 142 is designed to comfortably secure or carry an individual within the vehicle 103 as the individual is being transported. Seats 142 generally have predetermined positions and orientations. For example, a seat may be position towards the front, back, left, or right, or a combination thereof. The vehicle 103 may be an autonomous vehicle such that it is driverless or it may include a seat 142 dedicated for a driver and remaining seats dedicated for passengers.

One or more displays 148 may be positioned in front of one or more seats 142. In some embodiments, at least some seats 142 have a dedicated display 148 so that each occupant may view an individual display 148. A display 148 may comprise a video screen and speakers. The display 148 may present videos, play music, provide entertainment, and provide information to vehicle occupants. In some embodiments, the display 148 may be part of a mobile device 102. The display 148 may be a touch screen or may include input controls to receive user input. Each display 148 of a vehicle may be configured to independently present content to vehicle occupants such that each vehicle occupant may customize the content presented by an individual display 148. Each display may be selected according to a display identifier. For example, instructions to control the display may include the display identifier.

The vehicle 103 may include one or more vehicle controls 149 for controlling vehicle settings. Vehicle controls 149 may be positioned throughout the vehicle 103 so that one or more occupants may manually select the vehicle controls 149. A vehicle control 149 may be a climate control, display control, volume control, video selector, audio selector, seat control, privacy control, or other controls used to customize the driving experience. A privacy control may be a control that manipulates a physical barrier to at least partially separate vehicle occupants. A privacy control may include a control for a curtain, a screen, and/or a wall. For example, if the vehicle 103 is a taxi that shuttles different occupants around as they share the taxi to different destinations, each occupant may have access to a privacy controls to have privacy from other occupants.

The vehicle controls 149 may be positioned near the display 148 or may be part of the display 148 if the display includes a touch screen. The vehicle controls 149 may be implemented as a combination of hardware and software for allowing occupants to make, edit, modify, or adjust user settings of the vehicle 103. For example, the vehicle controls 149 may comprise a menu system. The menu system may include a plurality of user selectable options to configure the vehicle.

The user input for the vehicle controls 149 may include, for example, a voice command, tactile touch, actuation of a button, knob, switch, or scroller, a gesture, posture when sitting in a vehicle seat, biometric input, or any other input from a user in the vehicle. User input may be sensed through one or more of the input systems in the vehicle 103. In some embodiments, the vehicle controls 149 may include virtual controls implemented by a graphical user interface presented by the display 148 and/or mobile device 102. For example, a user may provide user input to select vehicle controls 149 before a user enters the vehicle 103 using an interface rendered by the mobile device 102. The mobile device 102 may render a display to depicted virtualized controls that a user may select. These virtualized controls correspond to the vehicle control 149 to configure a vehicle 103 remotely. For example, a user may specify via a mobile device 102, desired temperature settings, preferences for content, volume settings, etc.

The vehicle 103 also includes one or more sensors 151. Sensor(s) 151 may comprise a video camera, microphone, RFID reader, motion sensor, weight sensor, proximity sensor, biometric scanner, Light Detection and Ranging (LiDar) device, Radio Detection and Ranging (Radar) device, beam forming light sensor, audio sensor, and other sensors used to detect a person's identity and/or position within a vehicle 103. A sensor 151 generates sensor data that may be processed to determine the identity and/or position of an occupant. For example, a sensor 151 may include a camera, wherein the identity is determined based on performing facial recognition. The sensor 151 may also include a weight sensor installed in a seat 142 of the vehicle 103. In this example, the identity of an occupant may be determined based on measuring a weight distribution of the vehicle occupant. The sensor 151 may include an RFID reader to read RFID tags carried by vehicle occupants. The sensor 151 may comprises a microphone installed in the vehicle 103. The identity may be determined based on voice recognition. The microphone may be a directional microphone to detect a direction and position of an occupant when he or she is speaking.

The communication interface 136 may be coupled to the vehicle controls 149, displays, vehicle input systems, and sensors 151. The communication interface 136 may collect data received at the vehicle 103 and transmit it over the network 110. In addition, the communication interface 136 may receive data or control instructions over the network 110 and transmit them to the vehicle 103 and related vehicle components.

Cloud services 160 may also be accessible over the network. Cloud services 160 may be used for identifying a user (e.g., authenticating or authorizing a user). For example, the cloud service 160 may include a social media platform, a voice recognition service, a biometric service, or a third part service used to authenticate an individual based on user input.

Next is a general description of the operations of components of the networked environment 100 according to some embodiments. A user may use the mobile device 102 to register for the services provided by the customization application 106. The customization application 106 may create a user account 115 and user profile 121 for the user. The user may provide desired vehicle settings through the mobile device 102, which may be stored in a user profile 121.

Upon entering a vehicle 103, one or more sensors 151 may identify the user. For example, sensors 151 may be configured to transmit sensor data over the network 110 to the customization application 106. The customization application 106 may perform an analysis on the sensor data to identify the vehicle occupant. In addition, the sensor data may indicate a location or seat 142 where the occupant has been situated. Each seat 142 may correspond to a seat identifier. The sensor data may include a seat identifier to allow the customization application 106 to determine which seat 142 is being occupied. For example, each seat 142 may have a dedicated sensor to determine the identity of the occupant. Therefore, any data received from a particular sensor 151 is associated with a particular seat identifier.

Upon determining the identity of a vehicle occupant, the customization application 106 determines a user profile 121 that has been previously defined for the vehicle occupant. Each vehicle occupant may be associated with a user identifier. Upon detecting the identity of the occupant, the vehicle identifier is used to obtain a corresponding user profile 121.

Upon identifying the appropriate user profile 121, the customization application 106 extracts desired user settings and generates control instructions to implement the desired user settings. The control instructions are transmitted over the network 110 and received by the communication interface 136 of the vehicle 103 carrying the occupant. The vehicle may include computing components such as a processor and memory to process the control instructions so that they are implemented in the vehicle 103. For example, if the user profile specifies a particular temperature, the vehicle 103 may receive temperature settings in response to the vehicle identifying the occupant. Thereafter, the vehicle may implement the temperature settings.

In addition, the control instructions may be generated according to the seat identifier of the vehicle occupant. For example, depending on which seat 142 the occupant sits in, the control instructions are applied to the corresponding seat identifier. In this respect, the control instructions may cause vehicle controls 149 to be adjusted so it is customized with respect to the occupant's seat 142, but not the remaining seats 142.

Figure 2:
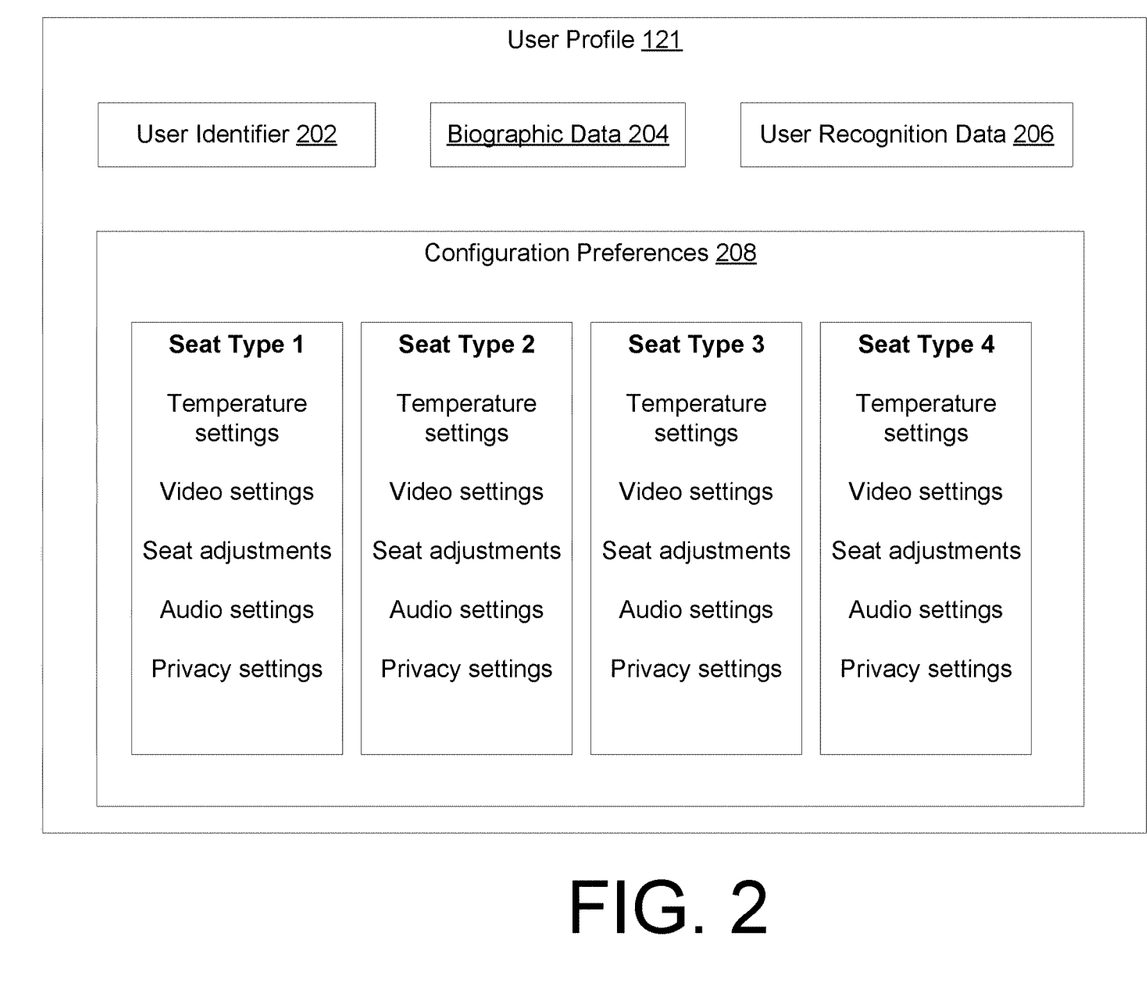
FIG. 2 is example of a user profile implemented in the networked environment of FIG. 1 according to various embodiments of the present disclosure.

FIG. 2 is example of a user profile 121 implemented in the networked environment 100 of FIG. 1 according to various embodiments of the present disclosure. The user profile 121 may include a user identifier 202, a user's biographic data 204, user recognition data 206, and configuration preferences 208. The data contained in the user profile 121 may be provided by a user via a mobile device 102. In other embodiments, as a user manipulates vehicle controls 149, the user profile 121 may be dynamically updated.

The user identifier 202 may include a user name. The user profile 121 may include a user's credentials to allow the system to authenticate the user. A user's biographic data 204 may include a user's age, gender, and other personal information about the user. As explained below, a user's biographic data 204 may be used to control or limit the content presented in the vehicle 103. For example, the biographic data 204 may indicate that the user is an underage minor such that content presented in the vehicle 103 should be restricted. This may allow parental control of content presented in the vehicle 103. For example, content may be subject to content filters to limit what content should be presented by a display 148.

The user recognition data 206 may include voice prints, finger prints, facial images, biometric data, and other information used to recognize a user. When sensor data is received, the sensor data may be analyzed with respect to user recognition data 206 to determine a user identity. For example, if the sensor data includes facial images or video, the system may perform facial recognition using the user recognition data 206 to determine a user identity. Upon detecting a match, the system obtains a user identifier 202.

The configuration preferences 208 for a user may be organized by seat types. A seat type may be for example, front left, front right, rear left, rear right, rear center, etc. The seat type may generally describe the seat's position relative to the vehicle 103. A seat identifier may correspond or otherwise map to a seat type. The seat identifier may also comprise the seat type.

In some embodiments, user settings are stored for each seat type. User settings include temperature settings, video settings, seat adjustments, audio settings, privacy settings, or other settings for configuring a vehicle 103. Temperature settings may include fan speed, preferred temperature, and other settings that control a vehicle's heating and cooling system. Video settings may include preferred genres of content, the identification of specific content, display settings such as, for example, brightness, and other settings for controlling the presentation of video. Seat adjustments may include settings for height, recline, lumbar support, armrest height, and other settings for configuring a seat 142. Audio settings may include, preferred genres of content, the identification of specific content, audio playback settings such as, for example, volume, and other settings for controlling the playback of audio. Privacy settings may include, whether or not to implement a privacy screen and the position or orientation of a privacy screen.

A user may manually input configuration parameters through an interface provided by a mobile device 102. In other embodiments, as a user manipulates vehicle controls 149, the configuration parameters 208 may be automatically updated to reflect an average or typical setting or the most recent user settings. In some embodiments, the configuration preferences 208 may include default settings that are updated in response to the user providing input to various vehicle controls 149.

As shown in FIG. 2, the user settings may be organized by seat type and/or a seat identifier. In this example, upon detecting the seat identifier associated with a vehicle occupant, the user settings may be applied to the vehicle 103 in a manner that this is specific to the seat 142 associated with the seat identifier. The customization application 106 may generate control instructions according to the user profile 121 to control the vehicle.

Figure 3A:
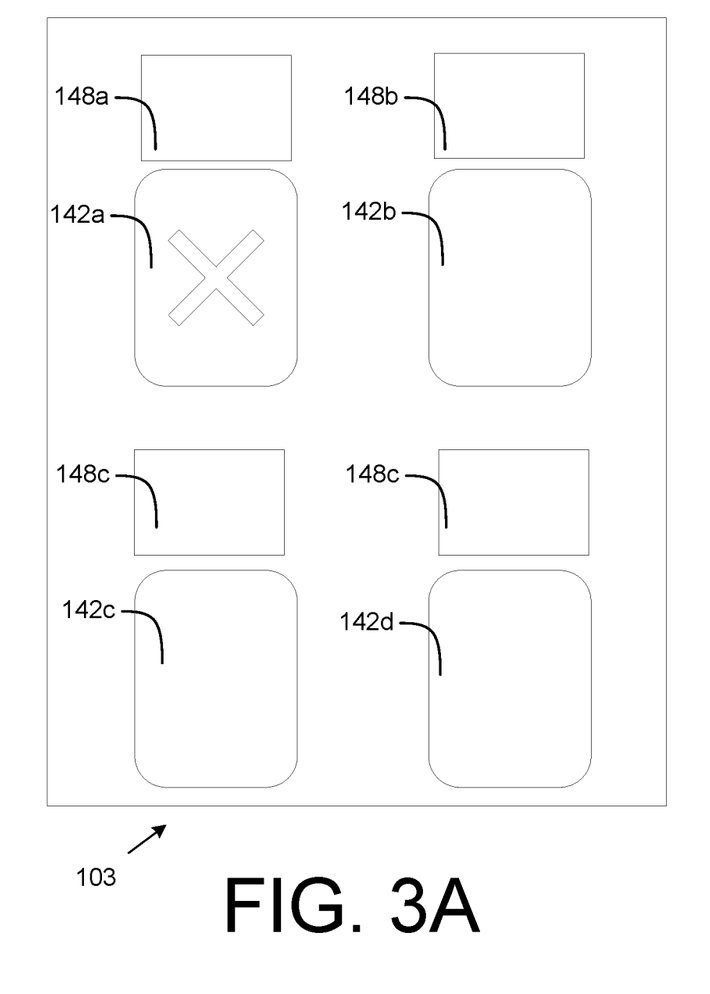
FIGS. 3A and 3B illustrate examples of operations that may take place in the networked environment of FIG. 1 according to various embodiments of the present disclosure.
Figure 3B:
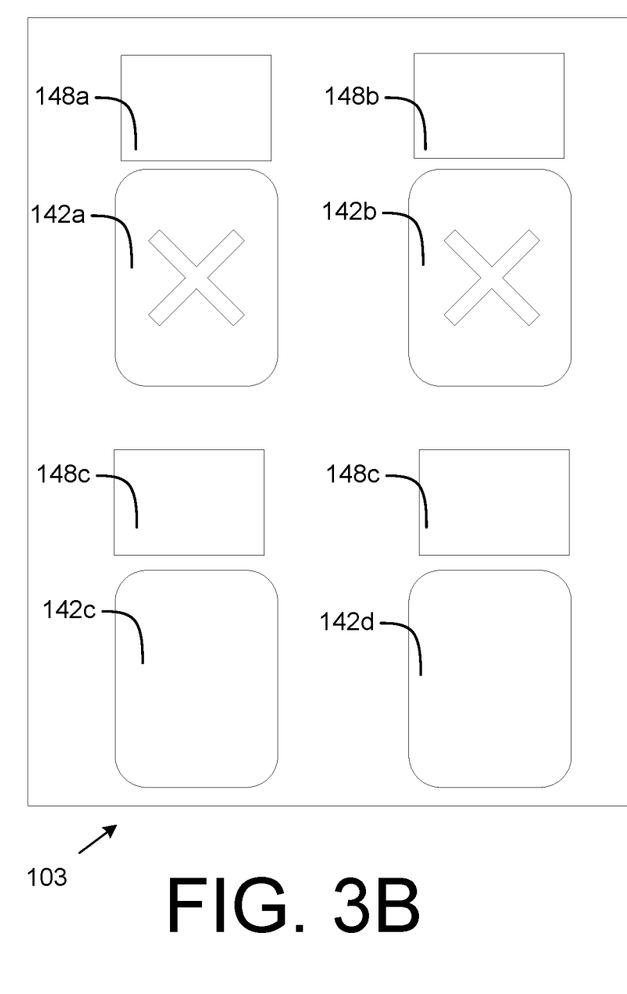

FIGS. 3A and 3B illustrate examples of operations that may take place in the networked environment 100 of FIG. 1 according to various embodiments of the present disclosure. FIGS. 3A and 3B depict a vehicle 103 having a first seat 142a, second seat 142b, third seat 142c, and fourth seat 142d. A first display 148a is viewable to the occupant of the first seat 142a. A second display 148b is viewable to the occupant of the second seat 142b. A third display 148c is viewable to the occupant of the third seat 142c. And, a fourth display 148d is viewable to the occupant of the first seat 142d. Thus, each display 148a-d is personal to a corresponding occupant. In some embodiments, each display 148a-d operates independently with respect to one another. In some embodiments, each display 148a-d is in the off state until a corresponding seat 142a-d becomes occupied.

FIG. 3A shows a first user who occupies a first seat 142a. Upon occupying the first seat 142a, one or more sensors 151 in the vehicle 103 transmit sensor data. The sensor data is used to identify the first user and a first user identifier is determined form the sensor data. In addition, based on the sensor data, a first seat identifier corresponding to the first seat 142a is determined. The user profile 121 corresponding to the first user identifier is accessed and one or more user settings are determined. In some embodiments, the user settings are specific to the seat identifier and the user identifier.

In one example, the user profile 121 for the first user indicates that the user preferences to watch a particular television show rated for mature audiences. In addition, the user preferences indicate that the first user prefers a particular seat position and privacy settings when the vehicle is shared with other occupants. Upon determining the first user identifier and seat identifier, the system generates corresponding control instructions based on corresponding user settings or preferences. The vehicle controls 149 are controlled by the control instructions to implement these user settings or preferences. For example, the first seat 142a may automatically adjust according to the seat settings of a user profile 121. The first display 148a may automatically begin playing the particular television show according to the user profile.

In FIG. 3B a second user enters the vehicle 103 and occupies the second seat 142b, which is adjacent to the first seat 142a. The system determines a second user identifier for the second user and further determines that the second user is occupying the second seat 142b. The user profile 121 for the second identifier 142b is accessed to determine user settings or preferences for the second user.

In response to two vehicle occupants, each having their own personalized user profiles 121, the system implements one or more rules to configure the vehicle 103. These rules may be customized within a user profile 121. For example, upon detecting the presence of the second user, the user profile 121 of the first user may indicate that specific privacy settings should be implemented. In this example, when the second user enters the vehicle, the system may generate control instructions that are implemented by the vehicle 103 to actuate a privacy screen. Without additional occupants, the first user may not desire the use of a privacy screen.

As another example, the first user may prefer to listen to audio at a lower volume when a second user occupies the vehicle 103. Upon determining the second user identification or determining the presence of the second user, the system may generate updated control instructions to update the user settings for vehicle audio.

In some embodiments, the system may implement predetermined rules to resolve user settings associated with multiple vehicle occupants. For example, if a minor or underage passenger occupies the vehicle 103, then the vehicle 103 may automatically implement a privacy screen around the presentation of mature content, attenuate volume associated with mature content, or otherwise limit or restrict the presentation of mature content. In some embodiments, upon the detection of additional vehicle occupants, and depending on their respective seat identifiers, the system may automatically adjust the seat adjustments to provide additional legroom. In some embodiments, the system may limit the maximum volume level in response to the presence of multiple vehicle occupants.

Figure 4:
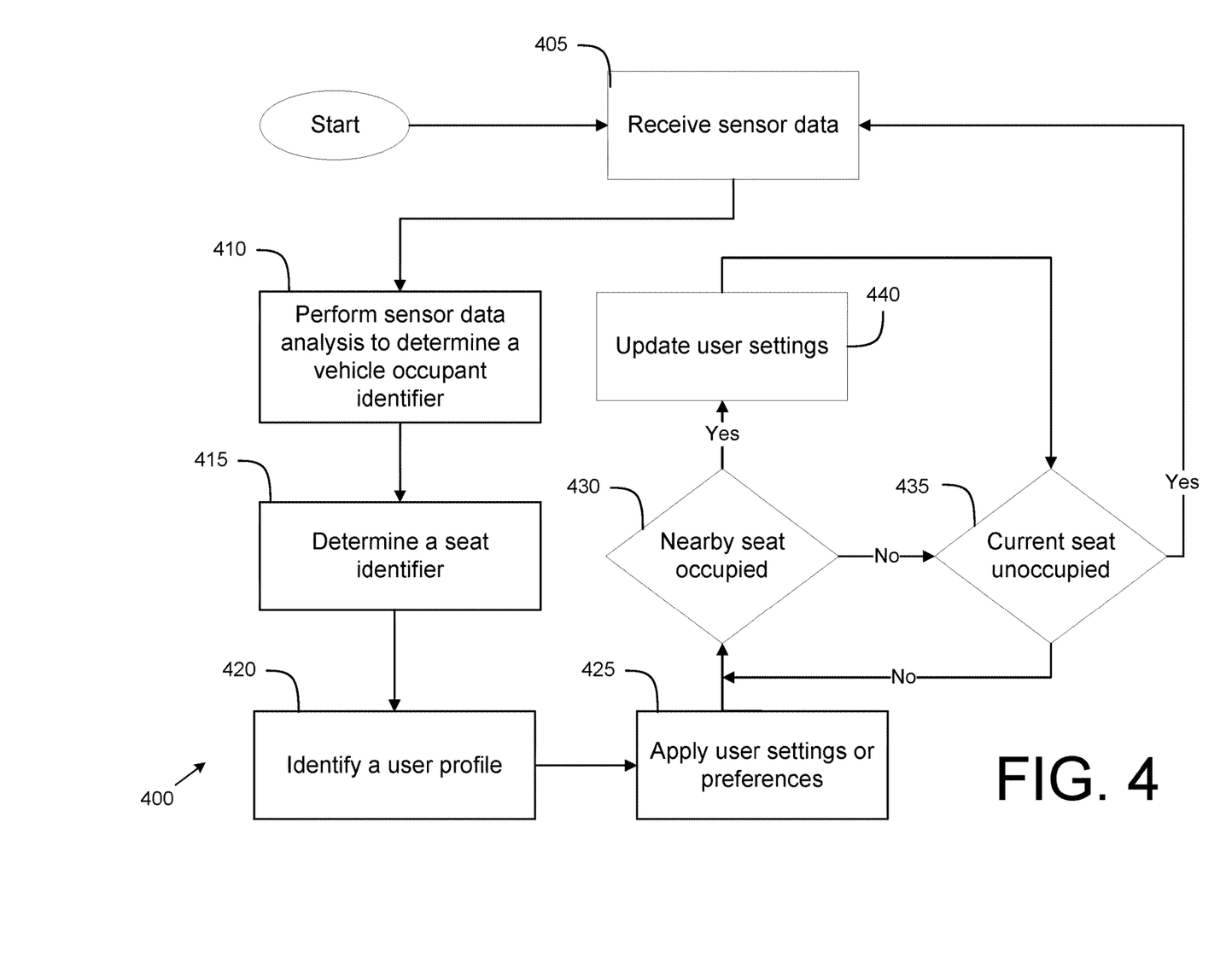
FIG. 4 is a flowchart illustrating an example of the functionality implemented by a computing system in in the networked environment of FIG. 1 according to various embodiments of the present disclosure.

FIG. 4 is a flowchart illustrating an example of the functionality implemented by a computing system 101 in in the networked environment of FIG. 1 according to various embodiments of the present disclosure. For example, the functionality of FIG. 4 may be implemented by a customization application 106. It is understood that the flowchart of FIG. 4 provides merely an example of the many different types of functional arrangements that may be employed by the computing system 101 described herein. The flowchart of FIG. 4 may be viewed as depicting an example of elements of a method 400 implemented in the computing system 101 according to one or more embodiments. In some embodiments, the functionality of FIG. 4 may be implemented within one or more computing devices installed within a vehicle 103.

At item 405, the system receives sensor data. The sensor data may originate from one or more sensors 151. The sensor data may comprise raw data used to identify an individual and/or the position of the individual. The sensor data may include a sensor identifier associated with the sensor 151 that produced the sensor data. The sensor identifier may be used to determine the location of the sensor to assist in identifying a seat 142. The sensor data may include sensor samples or raw data that is packetized for transmission over a network 110. The sensor data may be collected within the vehicle 103 and sent to the communication interface 136 for transmission to the computing system 101. A vehicle interface 124 implemented in the computing system 101 may receive the sensor data for processing.

At item 410, the system performs a sensor data analysis to determine a vehicle occupant identifier. For example, if the sensor data comprises facial imagery, then the system may perform facial recognition. If the sensor data comprises audio data, then the system may perform vocal recognition. The sensor data may comprise data from multiple types of sensors to determine the identity of the vehicle occupant. The sensor data may comprise a biometric scan such as a fingerprint scan or retinal scan. The system may process the sensor data and compare it to user recognition data 206 to determine a vehicle occupant identifier (e.g., user identifier 202) associated with the vehicle occupant.

In some embodiments, the vehicle occupant identifier is determined by connecting the mobile device 102 of the vehicle occupant to a hot spot or access point installed in the vehicle. For example, upon connecting the mobile device 102 to the hot spot or access point of the vehicle 103, the hot spot or access point establishes communication with a mobile application executing in the mobile device 102. The mobile application may convey a stored vehicle occupant identifier to the hot spot or access point upon establishing a connection. The communication interface 136 may transmit the vehicle occupant identifier to the customization application 106.

At item 415, the system determines a seat identifier. The seat identifier may be included in the sensor data. For example, each seat 142 may be monitored by a dedicated sensor 151. Thus, the receipt of sensor data allows the system to determine which seat 142 is being occupied by the vehicle occupant. In some embodiments, the vehicle 103 may include a motion sensor, weight sensor, directional microphone, or image-based sensor to determine which seat 142 is being occupied. By analyzing the sensor data, a seat identifier may be determined. The system may determine a seat identifier and map it to a seat position or otherwise derive a seat position, where the seat position indicates the seat's relative position within the vehicle 103. The seat identifier may comprise data indicating the seat's position within the vehicle.

In some embodiments, the vehicle 103 includes seats 142, where each seat has a weight sensor for detecting the presence and/or identity of the vehicle occupant. The seat identifier is determined depending on which weight sensor detects weight that corresponds to an occupant.

At item 420, the system identifies a user profile 121. By determining the vehicle occupant identifier or other user identifier based on the sensor data, the system may access a data store 104 to determine the user profile 121 corresponding to the vehicle occupant identifier.

At item 425, the system applies the user settings or preferences. The user profile 121 may include various vehicle configuration preferences 208. These vehicle configuration preferences 208 may contain user settings for how a particular user wishes to configure the vehicle 103. In some embodiments, the user settings are organized by seat type or, in other words, seat position. For example, a user may prefer particular seat adjustment for a driver seat but different seat adjustments when sitting in a passenger seat.

Upon referencing the user profile 121 that corresponds to a vehicle occupant identifier, the system may automatically generate one or more control instructions to apply or implement a user setting in the user profile 121. For example, if the user setting indicates a temperature setting for 75 degrees, then the system may generate a control instruction to control the vehicle temperature accordingly. The control instruction may be transmitted to the control interface 136. The vehicle 103 may then implement the control instruction by submitting it as an input to the appropriate vehicle control 149. The vehicle 103 is then configured according to the control instruction.

For example, the control instruction may include an instruction to adjust climate or temperature settings. In addition, the control instruction may indicate a zone within the vehicle to implement the instruction, where the zone corresponds to the location of the seat 142 that is occupied by the user. The control instruction may include an instruction to adjust seat settings, adjust a privacy screen, or instructions for other vehicle configurations.

As another example, if the user profile 121 indicates a user preference for particular video content, then the system may generate and transmit an instruction to control content presented by a display 148 according to the user profile. The instruction may indicate a display identifier based on the seat identifier so that the most appropriately positioned display 148 presents the content.

At item 430 the system checks if a nearby seat is occupied. For example, the system may periodically receive sensor data from a vehicle to indicate which seats 142 are occupied. As discussed above with respect to item 415, the system determines which seat identifiers correspond to seats 142 that are occupied. For example, as discussed in the example of FIG. 3B, the system may determine that a new user has occupied a second seat 142*b* when a first seat 142*a* was previously occupied.

At item 435, the system may also check if the current seat 142 is unoccupied. For example, a user may eventually leave his or her seat. To determine whether a user has left his or her seat 142, the system continues to receive sensor data indicating whether a seat 142 is occupied. If the user has not left the seat 142, the system continues to check whether nearby seats 142 are occupied (at item 430) and continues to check if the current seat becomes unoccupied.

If a nearby seat becomes occupied, then at item 440, the system updates user settings. The system may detect the identity of a second occupant based on additional sensor data, determine a second seat identifier associated with the seat 142 occupied by the second occupant, identify the user profile 121 of the second occupant, and generate control instructions to implement user settings contained in the user profile 121 of the second occupant.

In some embodiments, the system resolves conflicts or implements compromises to address situations where the vehicle 103 carries more than one occupant having different user profiles 121. The result may involve generating an additional control instruction to update a user setting.

The system may implement one or more rules to determine the manner in updating a user setting in response to detecting a new vehicle occupant. The rules may be defined in a user profile 121 or may be globally implemented rules. For example, if a second occupant is an underage minor, according to biographic data 204, then all content displayed in the vehicle may be limited to accommodate the underage occupant. This rule may trigger the transmission of a control instruction to update user settings relating to the presentation of content.

As another example, in response to detecting the presence or identity of a new occupant, the subsequent control instruction may be an instruction to limit playback volume, control a privacy screen, adjust the seat settings, adjust the temperature to an average temperature, or other instructions to adjust a vehicle control 149.

Figure 5:
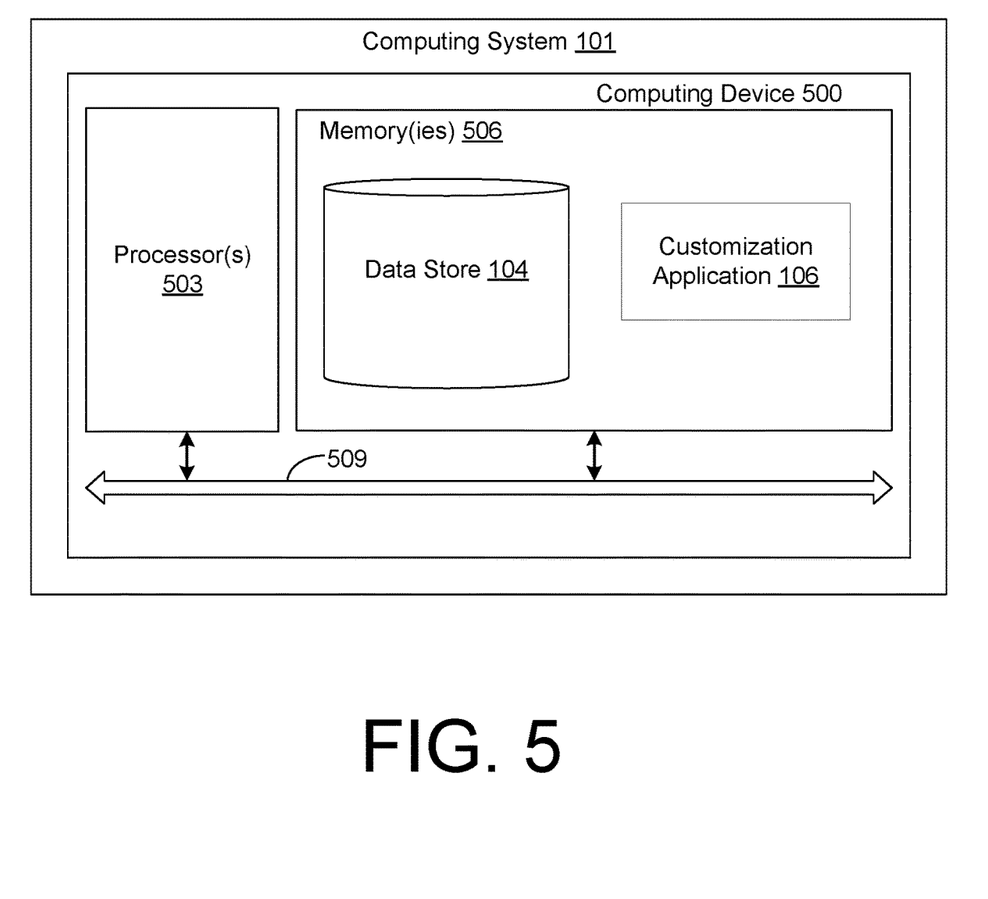
FIG. 5 is a schematic block diagram that provides one example illustration of a computing system according to various embodiments of the present disclosure.

FIG. 5 is a schematic block diagram that provides one example illustration of a computing system 101 according to various embodiments of the present disclosure. The computing system 101 may include one or more computing devices 500 used to implement the computing functionality of computing system 101 in the networked environment 100 of FIG. 1. A computing device 500 includes at least one processor circuit, for example, having a processor 503 and memory 506, both of which are coupled to a local interface 509 or bus. The local interface 509 may comprise, for example, a data bus with an accompanying address/control bus or other bus structure as can be appreciated. A computing system may carry out the method 400 described in FIG. 4.

Stored in the memory 506 are both data and several components that are executable by the processor 503. In particular, stored in the memory 506 and executable by the processor 503 is a data store 104 and the customization application 106.

It is understood that there may be other applications that are stored in the memory 506 and are executable by the processor 503 as can be appreciated. Where any component discussed herein is implemented in the form of software, any one of a number of programming languages may be employed, such as, for example, C, C++, C#, Objective C, Java®, JavaScript®, Perl, PHP, Visual Basic®, Python®, Ruby, or other programming languages.

Several software components are stored in the memory 506 and are executable by the processor 503. In this respect, the term "executable" means a program file that is in a form that may ultimately be run by the processor 503. Examples of executable programs may be, for example, a compiled program that may be translated into machine code in a format that may be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors 503 and/or multiple processor cores and the memory 506 may represent multiple memories 506 that operate in parallel processing circuits, respectively. In such a case, the local interface 509 may be an appropriate network that facilitates communication between any two of the multiple processors 503, between any processor 503 and any of the memories 506, or between any two of the memories 506, etc.

Although components described herein may be embodied in software or code executed by hardware as discussed above, as an alternative the same may also be embodied in dedicated hardware or a combination of software/general purpose hardware and dedicated hardware. If embodied in dedicated hardware, each may be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc.

The flowchart discussed above show the functionality and operation of an implementation of components within a vehicle, a computing system 101, or a combination thereof. If embodied in software, each box may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system, such as a processor in a computer system or other system. The machine code may be converted from the source code, etc. If embodied in hardware, each block may represent a circuit or a number of interconnected circuits to implement the specified logical function(s).

Although the flowchart shows a specific order of execution, it is understood that the order of execution may differ from that which is depicted. For example, the order of execution of two or more boxes may be scrambled relative to the order shown. Also, two or more boxes shown in succession may be executed concurrently or with partial concurrence. Further, in some embodiments, one or more of the boxes may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

The components carrying out the operations of the flowchart may also comprise software or code that may be embodied in any non-transitory computer-readable medium for use by or in connection with an instruction execution system such as, for example, a processor in a computer system or other system. In this sense, the logic may comprise, for example, statements including instructions and declarations that may be fetched from the computer-readable medium and executed by the instruction execution system. In the context of the present disclosure, a "computer-readable medium" may be any medium that may contain, store, or maintain the logic or application described herein for use by or in connection with the instruction execution system.

The computer-readable medium may comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, Non volatile embedded devices using NOR-configured Flash, managed NAND-configured Flash, embedded Multi-Media Controller (eMMC) storage, Universal Flash Storage (UFS), unmanaged NAND-configured Flash, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the customization application 106, may be implemented and structured in a variety of ways. For example, one or more applications described may be implemented as modules or components of a single application. Further, one or more applications described herein may be executed in shared or separate computing devices or a combination thereof. Additionally, it is understood that terms such as "application," "service," "system," "module," "engine" and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A computer implemented method comprising:

storing a plurality of user profiles, each profile having configuration preferences for a respective user, each respective configuration preference corresponding to seat position in a vehicle, and each respective configuration preference including privacy and temperature settings, wherein each profile further has biographic data including an age of the respective user;

receiving, by a computing device, sensor data from at least one sensor installed inside the vehicle;

determining, by the computing device, a first vehicle occupant identifier of a first vehicle occupant based on the sensor data;

determining, by the computing device, a first seat identifier that is associated with the first vehicle occupant identifier;

identifying, by the computing device, a first user profile for the first vehicle occupant, wherein the first user profile indicates a first privacy setting and a temperature setting for a first seat, and further indicates a first age of the first vehicle occupant;

restricting, based on the first age, content displayed in the vehicle, wherein the content is subject to content filters to limit the content displayed;

monitoring the sensor data to determine that occupants of the vehicle have changed seat positions;

determining, based on the monitoring, that the first vehicle occupant has changed seat position from the first seat to a new seat;

determining whether a seat nearby the new seat is occupied;

in response to determining that the first vehicle occupant has changed seat position and determining that the seat nearby the new seat is occupied, applying a new privacy setting and a new temperature setting from the first user profile for the new seat;

detecting a presence of a second vehicle occupant;

implementing predetermined rules to resolve user settings associated with multiple vehicle occupants;

in response to determining a presence of the multiple vehicle occupants, limiting a maximum volume level in the vehicle;

based on the first age of the first vehicle occupant, automatically implementing a privacy screen around presentation of mature content and attenuating volume associated with the mature content;

in response to detecting the presence of the second vehicle occupant, automatically transmitting, by the computing device, at least one instruction to apply at least one first user setting based on the first user profile and the first seat identifier, wherein transmitting the instruction causes actuating a physical barrier of the vehicle according to the first privacy setting, and wherein the physical barrier is configured to separate the first and second vehicle occupants;

determining, by the computing device, a second vehicle occupant identifier of the second vehicle occupant based on the sensor data, wherein the first privacy setting is applied based on the first and second vehicle occupant identifiers;

automatically transmitting, by the computing device, an instruction to implement a global rule regarding control of at least one second user setting affecting both the first vehicle occupant and the second vehicle occupant to update the second user setting in response to detecting the presence of the second vehicle occupant; and automatically transmitting an instruction to update the second user setting to apply an occupant specific rule regarding the second vehicle occupant.

2. The method of claim 1, wherein determining the first vehicle occupant identifier comprises determining the first vehicle occupant identifier from the sensor data based on performing facial recognition.

3. The method of claim 1, wherein determining the first vehicle occupant identifier comprises determining the first vehicle occupant identifier from the sensor data based on measuring a weight of the first vehicle occupant.

4. The method of claim 1, wherein determining the first vehicle occupant identifier comprises determining the first vehicle occupant identifier from the sensor data based on voice recognition.

5. The method of claim 4, wherein associating the first vehicle occupant with the first seat identifier comprises determining a direction of an audio source.

6. The method of claim 1, wherein the vehicle comprises a plurality of displays, and wherein the instruction to apply the first user setting comprises a display identifier and the first seat identifier.

7. The method of claim 1, wherein the first user profile comprises settings for a seat adjustment in the vehicle based on the first seat identifier.

8. A system, comprising:

a processor; and a memory coupled to a processor, the memory comprising a plurality of instructions which, when executed, cause the processor to:

store a plurality of user profiles, each profile having configuration preferences for a respective user, each respective configuration preference corresponding to seat position in a vehicle, and each respective configuration preference including privacy and temperature settings, wherein each profile further has biographic data including an age of the respective user;

receive sensor data from the vehicle;

determine a first vehicle occupant identifier of a first vehicle occupant based on the sensor data;

determine a first seat identifier that is associated with the first vehicle occupant identifier among a plurality of seat identifiers;

identify a first user profile for the first vehicle occupant, wherein the first user profile indicates a first privacy setting and a temperature setting for a first seat, and further indicates a first age of the first vehicle occupant;

restrict, based on the first age, content displayed in the vehicle, wherein the content is subject to content filters to limit the content displayed;

monitor the sensor data to determine that occupants of the vehicle have changed seat positions;

determine, based on the monitoring, that the first vehicle occupant has changed seat position from the first seat to a new seat;

determine whether a seat nearby the new seat is occupied;

in response to determining that the first vehicle occupant has changed seat position and determining that the seat nearby the new seat is occupied, apply a new privacy setting and a new temperature setting from the first user profile for the new seat;

detect a presence of a second vehicle occupant;

implement predetermined rules to resolve user settings associated with multiple vehicle occupants;

in response to determining a presence of the multiple vehicle occupants, limit a maximum volume level in the vehicle;

based on the first age of the first vehicle occupant, automatically implement a privacy screen around presentation of mature content and attenuate volume associated with the mature content;

in response to detecting the presence of the second vehicle occupant, automatically transmit an instruction to apply at least one first user setting based on the first user profile, wherein transmitting the instruction causes actuating a physical barrier of the vehicle according to the first privacy setting, wherein the physical barrier is configured to separate the first and second vehicle occupants, and wherein the first privacy setting is applied based on the first vehicle occupant identifier and a second vehicle occupant identifier of the second vehicle occupant; and automatically transmit a subsequent instruction implementing a global rule regarding control of at least one second user setting affecting both the first vehicle occupant and the second vehicle occupant to update the second user setting in response to detecting the presence of the second vehicle occupant.

9. The system of claim 8, wherein the plurality of instructions which, when executed, further cause the processor to update the second user setting based on determining an identity of the second vehicle occupant.

10. The system of claim 8, wherein determining the first vehicle occupant identifier comprises determining the first vehicle occupant identifier based on facial recognition.

11. The system of claim 8, wherein the sensor data is from a microphone installed in the vehicle, and wherein determining the first vehicle occupant identifier comprises determining the first vehicle occupant identifier based on voice recognition.

12. The system of claim 11, wherein the first vehicle occupant identifier is associated with the first seat identifier by determining a direction of an audio source.

13. The system of claim 8, wherein the vehicle comprises a plurality of displays, and wherein the instruction to apply the first user setting comprises a display setting and the first seat identifier.

14. A system, comprising:
a memory; and
a processor coupled to a memory, the processor configured to:
store a plurality of user profiles, each profile having configuration preferences for a respective user, each respective configuration preference corresponding to seat position in a vehicle, and each respective configuration preference including privacy and temperature settings, wherein each profile further has biographic data including an age of the respective user;
receive sensor data from the vehicle, the vehicle comprising a plurality of displays;
determine a first vehicle occupant identifier of a first vehicle occupant based on the sensor data;
determine a first seat identifier that is associated with the first vehicle occupant identifier;
identify a user profile for the first vehicle occupant, wherein the user profile indicates a first privacy setting and a temperature setting for a first seat, and further indicates a first age of the first vehicle occupant;
restrict, based on the first age, content displayed in the vehicle, wherein the content is subject to content filters to limit the content displayed;
monitor the sensor data to determine that occupants of the vehicle have changed seat positions;
determine, based on the monitoring, that the first vehicle occupant has changed seat position from the first seat to a new seat;
determine whether a seat nearby the new seat is occupied;
in response to determining that the first vehicle occupant has changed seat position and determining that the seat nearby the new seat is occupied, apply a new privacy setting and a new temperature setting from the user profile for the new seat;
detect a presence of a second vehicle occupant in the vehicle;
implement predetermined rules to resolve user settings associated with multiple vehicle occupants;
in response to determining a presence of the multiple vehicle occupants, limit a maximum volume level in the vehicle;
based on the first age of the first vehicle occupant, automatically implement a privacy screen around presentation of mature content and attenuating volume associated with the mature content;
in response to detecting the presence of the second vehicle occupant, transmit at least one instruction to apply at least one user setting based on the user profile and the first seat identifier, wherein transmitting the instruction causes actuating a physical barrier of the vehicle, and wherein the physical barrier is configured to separate the first and second vehicle occupants; and
transmit an instruction to control first content presented by a display according to the user profile, wherein the display is associated with the first seat identifier.

15. The system of claim 14, wherein the processor is further configured to transmit a subsequent instruction to control the first content based on detecting the presence of the second vehicle occupant.

16. The system of claim 14, wherein the processor is further configured to transmit a subsequent instruction to control the first content based on determining an identity of the second vehicle occupant.

17. The system of claim 14, wherein the instruction to control the first content comprises configuring a filter to control available content.

18. The system of claim 14, wherein the sensor data is from at least one sensor installed in the vehicle.

* * * * *